Patented Jan. 25, 1938

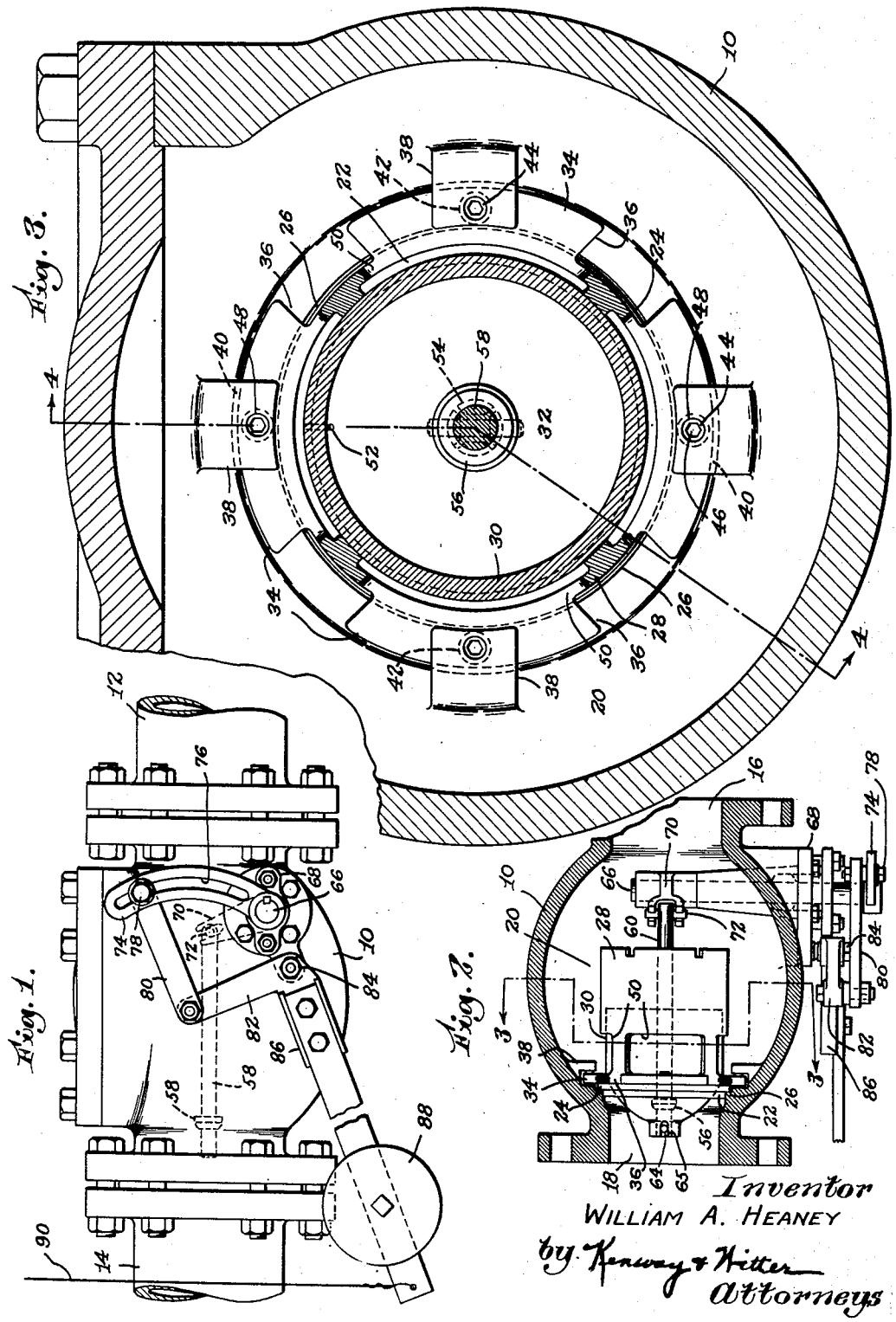

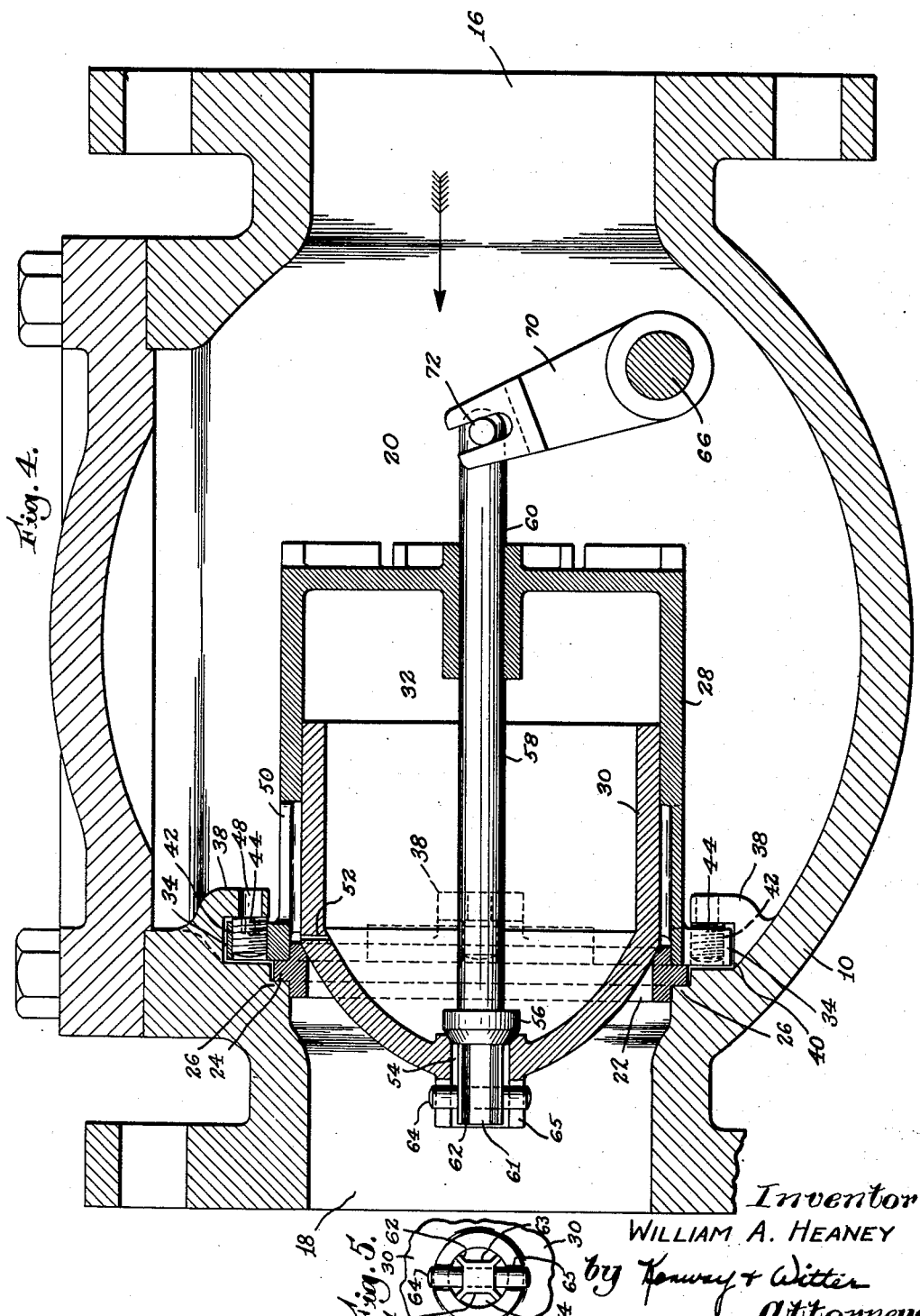

2,106,406

UNITED STATES PATENT OFFICE 2,106,406

VALVE

William A. Heaney, Salem, Mass.

Application December 1, 1934, Serial No. 755,552

7 Claims. (Cl. 277—44)

This invention relates to valves for controlling the flow of fluids, and more particularly to poppet valves for controlling the flow of steam and the like under relatively high pressures. Valves of this nature have heretofore been so constructed that the path of fluid flow therethrough has been in varying directions, usually relatively right angular, whereby causing such resistance to flow as to result in a relatively high pressure drop across the valve. One of the primary objects of my invention is the production of a new and improved valve of this nature providing a path of fluid flow therethrough following the general longitudinal line of the valve, thereby eliminating the sharp variations in direction of flow in valves heretofore known and so reducing the resistance to flow as to produce an extremely low pressure drop across the valve.

Fluid control valves of the above described nature heretofore known commonly employ a partition dividing the valve chamber into two compartments and have a valve seat located in the partition parallel to the general line of fluid flow through the valve, thus requiring the fluid to make two relatively right angular turns in passing through the valve. This arrangement permits the supporting of the valve poppet by mechanism located laterally of the valve body. In accordance with my invention, I locate the valve seat adjacent to and extending around the exit passage from the valve chamber and in a plane substantially at right angles to the line of fluid flow through the exit passage, and a housing is provided in the valve chamber forwardly of the seat for supporting the valve poppet. In a straight valve the fluid entrance and exit passages are substantially in alignment at opposite ends of the valve body and when, in such a valve constructed in accordance with my invention, the poppet is open, fluid is permitted to flow directly through the valve substantially along the general longitudinal line thereof, the devious right angular flow path of valves heretofore known being thereby eliminated and the resistance to flow accordingly decreased. The greater efficiency thus obtained permits an increased volume of flow through valves of corresponding sizes due to the straight path of flow and to the relatively low pressure drop across the improved valve and furthermore permits the use of smaller sized valves for the same flow volume.

The poppet of my improved valve is carried by a housing within the valve chamber and supported on the wall thereof preferably at the valve seat, the housing extending forwardly from the seat. Furthermore, the housing cooperates with the poppet to provide a balancing pressure chamber for the poppet and means exteriorly and interiorly of the valve body cooperates with and controls an exit port from the balancing chamber. Novel means is also provided for securing the seat and housing in place and the said means exteriorly of the valve body is constructed to provide relatively fine and coarse control of the valve, all as hereinafter more specifically described. The production of such an improved valve of relatively simple and economic construction and one in which the parts thereof are easily assembled and disassembled comprises a further object of the invention.

These and other features of the invention will be best understood and appreciated from the following description of a preferred embodiment thereof, selected for purposes of illustration and shown in the accompanying drawings, in which Fig. 1 is a side elevation of a valve embodying my invention;

Fig. 2 is a plan sectional view through the valve of Fig. 1;

Fig. 3 is an enlarged sectional view taken on line 3—3 of Fig. 2;

Fig. 4 is an enlarged sectional view taken on line 4—4 of Fig. 3; and

Fig. 5 is a fragmentary end elevation of the poppet shown in Fig. 4.

Referring now by reference characters to the drawings wherein I have shown a balanced single seated valve embodying my invention, 10 indicates the valve body or casing having pipes 12 and 14 connected to the ends thereof and in communication with entrance and exit passages 16 and 18 of the valve, the valve having a chamber 20 therein between these passages. The valve seat is placed at the exit end of the chamber and surrounds the exit passage 18, the seat preferably being located in a plane right angular to the line of fluid flow through the exit passage. As illustrated, the seat is provided by a ring 22 having a peripheral flange 24 supporting the ring on an annular shoulder 26 of the valve body. The ring is held securely in place by the engagement therewith of a housing 28 supporting the valve poppet 30 and in turn secured to the valve body, all as hereinafter specifically described.

The poppet 30 has a conical end portion for engaging the valve seat and a cylindrical portion sliding piston-like within the housing 28 and forming therewith a balancing pressure chamber 32 for the poppet. The housing is provided with an annular flange 34 extending radially outward from the open end thereof and this flange is recessed at relatively spaced portions 36 corresponding to the spacing of a plurality of lugs 38 integral with the valve body and overhanging an annular recess or depression 40 within the valve body and surrounding the valve seat. As thus constructed, the flanged end 34 of the housing may, by aligning the recesses 36 with the lugs 38, be passed into the recess 40 and engaged with the annular shoulder 26 of the valve seat ring. The housing may then be rotated to the position of Fig. 3, wherein the lugs 38 prevent outward movement of the housing.

The housing may be secured tightly beneath the lugs 38, in the position shown in Fig. 3, by any suitable and convenient means and for this purpose I have devised the following described mechanism: Four threaded holes 42 are provided within the flange 34 and four set screws 44 having polygonal sockets 46 therein are threaded into these holes. The screws are threaded into the holes prior to the placing of the flange into the recess 40 and the screws are of a length not greater than the distance between the bottom walls of the lugs and the bottom of the recess, whereby the flange may be rotated to the position of Fig. 3. Each lug 38 also has a hole 48 therethrough of a size to receive a wrench for engaging the socket 46 but preferably of smaller diameter than the screws 44. When the flange has been placed to the position of Fig. 3, the screws are rotated in a direction bearing against the lugs 38 whereby to force and hold the flange 34 in tight engagement with the flange 24 of the ring 22. Thus the housing and valve seat ring are locked tightly in place.

Openings 50 are provided through the wall of the housing adjacent to the valve seat for permitting the passage of fluid to and past the seat and a relatively small vent from the chamber 20 to the pressure chamber 32 is provided through the poppet wall at 52. Passage of fluid under pressure from the chamber 20 to the chamber 32 normally reacts against the poppet to hold it engaged with its seat. An exit port 54 from the chamber 32 is formed through the closed end of the poppet and the escape of fluid through this port is controlled by the engagement with the port seat of the conical portion of a head 56 carried by a rod 58. This rod has a round portion extending through the end wall of the housing at 60 and a square forwardly extending portion 61 supported by four fins 62 engaging the wall of the port 54. The spaces 63 between the fins provide for free passage of fluid escaping through the port. Movement of the rod 58 to the right relative to the poppet (Fig. 4) is limited by a pin 64 carried by the squared portion of the rod and engaging within oppositely disposed slots 65 within the end of the poppet.

The position of the poppet is controlled by the rod 58. When the head 56 closes the port 54, pressure builds up within the chamber 32 and holds the poppet onto its seat. When the rod 58 is withdrawn to open the port, the fluid escapes from the chamber 32 and permits the poppet to open. The position and movement of the rod may be controlled by automatic regulating mechanism or manually, and in either case connection therefrom to operating means exteriorly of the valve body is necessary. The following described means provides for such operation.

A shaft 66 extends through a stuffing box 68 and into the chamber 20 and an arm 70 on the inner end of this shaft has a pin and slot connection 72 with the free end of the rod. An arcuate arm 74 secured to the outer end of the shaft is slotted at 76 whereby to receive the stud 78 on one end of a link 80. The other end of the link is connected to the free end of one arm of a bell crank 82 pivoted at 84. The other arm 86 of the bell crank may carry a weight 88 and be engaged by a regulator cord or chain 90 as, for example, in the regulator shown in my Patent No. 1,840,813. It will be apparent that pivotal movement of the bell crank functions to move the rod 58 longitudinally and thereby control the exit of fluid through the port 54 and movement of the poppet. It will furthermore be apparent that the extent of movement of the shaft 66 and rod 58 relative to the movement of the bell crank will vary in accordance with the position of the stud 78 along the slot 76. In some instances it is desirable to give the rod 58 a substantial movement and operate it quickly upon relatively small movement of the controlling member which operates the arm 86 and in such cases the stud 78 would be adjusted to the lower end of the slot 76 whereby to provide a rather coarse or quick control. In cases where a fine and relatively slow control is desired, the stud 78 would be adjusted to a position adjacent to the upper end of the slot 76. Thus is provided an adjustment for quickly and easily adapting the device more efficiently to perform the particular function desired.

The operation and advantages of my invention are believed to be obvious. All parts of the device are relatively simple and economical to construct and may be assembled and disassembled with comparative ease. In the valve illustrated, the fluid entrance and exit passages 16 and 18 are in alignment at opposite ends of the valve body and the fluid passes through the valve along a path following the general longitudinal alignment thereof, the central location of the housing 28 requiring the fluid to take a gently curved path around the housing. When the invention is constructed in the form of a balanced valve, as illustrated in the drawings, the steam or other fluid to be controlled enters the pressure chamber 32 through the vent 52 and if the port 54 is closed this fluid builds up a pressure within the chamber 32 and forces and holds the poppet to its seat. Withdrawal of the rod 58 permits the escape of fluid from the chamber 32, thus relieving the pressure therein and permitting movement of the poppet from its seat. It will be noted that the pin 64 limits the movement of the head 56 from its seat and furthermore serves to withdraw the poppet bodily upon movement of the rod 58 to the right (Fig. 4). When the device is operated automatically to maintain a desired pressure, temperature, speed, liquid level or the like, the rod 58 normally has very little movement but is kept constantly in a slightly varied position to maintain the desired result. It will now be apparent that my improved valve is relatively simple and efficient and permits the flow of fluid therethrough with a minimum of resistance whereby permitting a greater relative volume of flow than has been possible in valves heretofore known and which have required the flow to follow tortuous paths setting up substantial resistance to the flow.

Having thus described my invention, what I claim as new and desire to secure by Letters Patent is:

1. A valve for controlling the flow of fluids, comprising a valve body having a fluid passage chamber therein and a recess in the body adjacent to the chamber, means providing a removable valve seat adjacent to the recess, a cooperating member within the recess engaging said means and having a threaded hole therein, and a screw threaded element in the hole of a length not greater than the distance between the two walls of the recess in alignment with the hole, one of said walls having a hole therethrough adapted to permit the passage of a wrench to engage and rotate said element and the element being of greater diameter than the last named hole and adapted upon rotation to crowd said member into tight holding contact with the valve seat means.

2. A valve for controlling the flow of fluids, comprising a valve body having a fluid passage chamber therein and an annular recess in the body around the chamber, annular means providing a removable valve seat adjacent to the recess, a plurality of lugs carried by the body member and overhanging the recess, an annular member adapted to fit into the recess over said means and having recessed portions adapting the annular member to slide over said lugs into the recess, the annular member having threaded holes therein relatively spaced to correspond with the spacing of said lugs, and screw threaded elements in said holes of a length not greater than the distance between the bottom wall of said lugs and the bottom of the recess, each lug having a hole therethrough adapted to permit the passage of a wrench to engage and rotate one of said screw threaded elements.

3. A valve for controlling the flow of fluids, comprising a valve body having a fluid passage chamber therein, means providing a valve seat within the chamber, a housing anchored to the body adjacent to the seat and extending forwardly therefrom into the chamber, the housing having a flange extending radially outward from the peripheral portion of the valve seat end thereof, means cooperating with the valve body and flange to secure the housing in said anchored position, a valve poppet carried by the housing and cooperating with the seat, and means interiorly and exteriorly of the valve for controlling the position of the poppet relative to the seat.

4. A valve for controlling the flow of fluids, comprising a valve body having a fluid passage chamber therein, means providing a valve seat within the chamber, a housing anchored to the body adjacent to the seat and extending forwardly therefrom into the chamber, means removably anchoring the housing and permitting its removal and replacement, a valve poppet carried by the housing and cooperating with the seat, and means interiorly and exteriorly of the valve for controlling the position of the poppet relative to the seat, the last named means including a shaft passing through the chamber wall exteriorly of the housing.

5. The valve defined in claim 4 wherein the first named means is a removable ring, and wherein the second named means removably anchors both the ring and housing in place.

6. A valve for controlling the flow of fluids, comprising a valve body having the fluid passage chamber therein, a removable ring providing a valve seat, a removable housing, the ring and housing having cooperating faces aligning the ring and housing when the faces are in engagement, means removably anchoring the ring and housing in place on the valve body with said faces in engagement and the housing extending forwardly from the seat into the chamber, a valve poppet carried by the housing and cooperating with the seat, and means interiorly and exteriorly of the valve for controlling the position of the poppet relative to the seat.

7. A valve for controlling the flow of fluids, comprising a valve body having a fluid passage chamber therein and entrance and exit passages open to the chamber, means providing a valve seat within the chamber, a housing anchored to the body and extending forwardly from the valve seat into the chamber, a valve poppet carried by the housing and cooperating with the seat, the poppet having a port through its forward end, a rod extending through the rear wall of the housing and having a head on its forward end cooperating with the port, and means including a shaft extending through the chamber wall and into the chamber and having connection with the rod outside of the housing for controlling the position of the head and poppet.

WILLIAM A. HEANEY.